US012613340B2

(12) United States Patent
Davydenko

(10) Patent No.: US 12,613,340 B2
(45) Date of Patent: Apr. 28, 2026

(54) DEVICE FOR SCANNING FREQUENCY-MODULATED CONTINUOUS WAVE (FMCW) LiDAR RANGE MEASUREMENT

(71) Applicant: Scantinel Photonics GmbH, Ulm (DE)

(72) Inventor: Vladimir Davydenko, Bad Herrenalb (DE)

(73) Assignee: Microvision, Inc., Redmond, WA (US)

( * ) Notice: Subject to any disclaimer, the term of this patent is extended or adjusted under 35 U.S.C. 154(b) by 941 days.

(21) Appl. No.: 17/878,784

(22) Filed: Aug. 1, 2022

(65) Prior Publication Data

US 2023/0176214 A1 Jun. 8, 2023

(30) Foreign Application Priority Data

Dec. 6, 2021 (EP) ..................................... 21212587

(51) Int. Cl.
| | |
|---|---|
| *G01S 17/34* | (2020.01) |
| *G01S 7/481* | (2006.01) |
| *G01S 7/4913* | (2020.01) |
| *G01S 17/931* | (2020.01) |

(52) U.S. Cl.
CPC ............ *G01S 17/34* (2020.01); *G01S 7/4812* (2013.01); *G01S 7/4817* (2013.01); *G01S 7/4913* (2013.01); *G01S 17/931* (2020.01)

(58) Field of Classification Search
CPC ................................... G01S 17/34; G02B 6/26
See application file for complete search history.

(56) References Cited

U.S. PATENT DOCUMENTS

| | | | |
|---|---|---|---|
| 2019/0257927 A1* | 8/2019 | Yao ......................... | G01S 7/4815 |
| 2020/0166647 A1 | 5/2020 | Crouch et al. | |
| 2020/0271761 A1* | 8/2020 | O'Keeffe .............. | G01S 7/4817 |
| 2021/0364607 A1* | 11/2021 | Davydenko ........... | G01S 7/4816 |

FOREIGN PATENT DOCUMENTS

WO     WO-2020033161 A1 *   2/2020   ........... G01S 7/4815

OTHER PUBLICATIONS

Scantinel Photonics GmbH, PCT/EP2022/082136, International Search Report and The Written Opinion, Feb. 16, 2023, 12 pgs.

* cited by examiner

*Primary Examiner* — Robert W Hodge
*Assistant Examiner* — Clara G Chilton
(74) *Attorney, Agent, or Firm* — Kevin D. Wills

(57) ABSTRACT

A device for scanning frequency-modulated continuous wave (FMCW) LiDAR range measurement has a light source producing light having a varying frequency, a splitter splitting the light into reference light and output light, and an optical system having an optical axis. A plurality of free space couplers are arranged along a line such that the distance between adjacent free space couplers increases with increasing distance from the optical axis. Each free space coupler outcouples the output light into the free space and receives input light that was reflected at an object. A detector detects a superposition of the input light with the reference light, and a calculation unit determines the range to the object from the superposition detected by the detector.

19 Claims, 5 Drawing Sheets

PY

PY

PX

DEVICE FOR SCANNING FREQUENCY-MODULATED CONTINUOUS WAVE (FMCW) LiDAR RANGE MEASUREMENT

CROSS REFERENCE TO RELATED APPLICATIONS

This application claims priority to European patent application No. 21212587.6, filed Dec. 6, 2021, which is incorporated by reference herein its entirety.

BACKGROUND OF THE INVENTION

1. Field of the Invention

The invention relates to a device for scanning range—and preferably also velocity—measurement relative to a moving or unmoving object on the basis of FMCW LiDAR technology. Such devices can be used, for example, in autonomously driving vehicles and may be implemented—at least to some extent—as photonic integrated circuits (PIC) that do not contain any moving parts.

2. Description of the Prior Art

Frequency-modulated continuous wave (FMCW) is a range and velocity measuring technology which was originally developed for RADAR applications. If light instead of radio waves are used, this technology is usually referred to as FMCW LiDAR, in which LiDAR is an acronym for "Light Detection And Ranging".

In FMCW LiDAR scanning devices, frequency-modulated light beams scan the environment. A small fraction of the light, which is diffusely reflected at an object, is received and superimposed with a local oscillator wave. The frequency difference between the two signals, which is usually referred to as beat frequency, is measured and used to compute the range of the object. By using a tunable laser as light source and a photodiode as detector, the beat frequency can be extracted directly from the photodiode current, because the photodiode delivers a current that is proportional to the squared sum of the two optical waves ("self-mixing effect"). If the Doppler shift is taken into account, the relative velocity between the scanning device and the object along the light propagation direction can be calculated, too.

Scanning devices based on this measurement principle have to be very robust and reliable if they are to be used in vehicles. This is true in particular if the vehicles drive autonomously, since the safety in autonomous driving is decisively dependent on the scanning device that is used to generate a three-dimensional profile of the environment. Scanning devices which are implemented as photonic integrated circuits (PIC) do not require moving components and are therefore particularly suitable for applications in vehicles.

Such PIC scanning devices are disclosed, for example, in WO 2021/209514 A1. The devices disclosed in this document include a distribution matrix comprising a plurality of optical switches that are arranged in a tree-like manner. This distribution matrix distributes the optical signals among different free space couplers that emit the optical signal into free space. The free space couplers are arranged in a front focal plane of an optical system that directs the optical signals optical waveguides into various directions.

FMCW LiDAR scanning devices for applications in vehicles require a high spatial resolution so that also small objects can be detected even at large distances, particularly if the vehicle is driving fast. However, it is difficult using the prior art approaches to collect sufficient range information in a very short time so that a high resolution three-dimensional profile of the environment can be obtained in real-time. One problem is, for example, that each optical switch in the distribution matrix causes optical losses. The larger the distribution matrix is, the higher are the optical losses. Therefore, the number of switch tree levels, and thus the number of free space couplers, should not exceed certain values. The same applies, mutatis mutandis, for alternative designs in which the active optical switches are replaced by passive optical splitters and optical amplifiers that can be selectively switched on and off.

SUMMARY OF THE INVENTION

It is an object of the present invention to increase the spatial resolution in a device for scanning FMCW LiDAR range measurement with simple means that do not cause additional optical losses.

In accordance with the invention, this object is achieved by a device for scanning FMCW LiDAR range measurement, wherein the device comprises a light source configured to produce light having a varying frequency, a splitter configured to split the light into reference light and output light, and a plurality of free space couplers that are arranged along a line. Each free space coupler is configured to outcouple the output light into the free space and to receive input light that was reflected at an object. An optical system has an optical axis and is configured to deflect the output light outcoupled by the free space couplers so that the output light is emitted in different directions lying in a first scanning plane. The device further comprises a detector configured to detect a superposition of the input light with the reference light. A calculation unit is configured to determine the range to the object from the superposition detected by the detectors. According to the invention, a distance between adjacent free space couplers increases with increasing distance from the optical axis of the optical system.

In conventional FMCW LiDAR scanning devices, the density of points, which are illuminated by the output light in a plane perpendicular to the optical axis of the optical system, is constant in order to obtain a homogenous spatial resolution in the field of view. The inventor has realized, however, that there is an additional scan effect that is caused by the movement of the vehicle. This additional scan effect can be understood if one considers different scanning light beams. A light beam that propagates parallel to the direction of movement of the vehicle, which direction typically coincides with the optical axis of the optical system, will impinge on the same point on a stationary object irrespective of the velocity of the vehicle and the range of the object. However, if the light beam is emitted under an angle with respect to the optical axis of the optical system, it will not impinge on the same point on the object. Instead, the point will change its position during the movement of the vehicle. This change depends primarily on the emission angle, the velocity of the vehicle and on the range. This can be considered as an additional scan effect that becomes significant only under certain—but relevant—conditions.

Because of this additional scan effect that is associated with the movement of the vehicle, the density of points, which are illuminated by the output light in a plane perpendicular to the optical axis, can be made smaller for larger emission angles. Since the density of points is directly related to the arrangement of the free space couplers, the desired variation of the density of points can be achieved by increasing the distance between adjacent free space couplers with increasing distance from the optical axis. Increasing the distance between adjacent free space couplers implies a smaller number of free space couplers required for the same spatial resolution, or being able to increase the spatial resolution without increasing the same number of free space couplers.

As a matter of course, the spatial resolution is increased only if the vehicle moves. If the vehicle is stationary, the density of points decreases with increasing distance to the optical axis. However, this is no significant disadvantage, because a high and homogenous spatial resolution is only important if the vehicle moves, particularly at higher velocities.

The distance between adjacent free space couplers may increase with increasing distance from the optical axis at least substantially according to a non-linear function, for example a quadratic, cubic, cosine or—most preferred— tangent function. Furthermore, it is not necessary that all available free space couplers have a distance to adjacent free space couplers that increases with increasing distance from the optical axis. For example, there may be a central region in which the free space couplers are arranged equidistant, and the distance between adjacent free space couplers increases only in a surrounding region.

In an embodiment, the free space couplers are arranged in a front focal plane of the optical system. This implies that the line, along which the free space couplers are arranged, is straight. However, optical systems providing a perfectly planar front focal plane are expensive and bulky. If the front focal plane is not planar but instead a curved front focal surface, the free space couplers may also be arranged on a curved line. Alternatively, the free space couplers are arranged along a straight line, but are moved during the operation of the device, as this is disclosed in unpublished German patent application No. 10 2021 111 949.9.

In an embodiment, the free space couplers are arranged not only along a line, but in a two-dimensional (preferably planar) array so that the output light is also emitted in different directions lying in a second scanning plane that is different from the first scanning plane. The density of the free space couplers decreases along a second scanning direction, which is defined by the second scanning plane, with increasing distance from the optical axis of the optical system. This is simply an extension of the principles described above from one dimension to two dimensions.

Manufacturing photonic integrated circuits comprising a two-dimensional array of free space couplers and the necessary optical waveguides is currently not possible for large scale commercial production at reasonable costs. It may therefore be preferable, as an alternative to free space couplers arranged in a two-dimensional array, to have the optical system arranged in a light path between the free space couplers and a mechanical scanning unit. The mechanical scanning unit comprises a movable mirror and is configured to deflect the output light along directions lying in a second scanning plane that is different from (and preferably perpendicular to) the first scanning plane. The device then further comprises a control unit that is configured to control the mechanical scanning unit such that a density of points, which are illuminated by the output light in a plane perpendicular to the optical axis, decreases along a second scanning direction, which is defined by the second scanning plane, with increasing distance from the optical axis.

The desired effect to have a density of points that decreases with increasing distance from the optical axis is thus achieved for the first scanning direction by the arrangement of the free space couplers, and for the second scanning direction by an appropriate control of a mechanical scanner.

If the mirror of the mechanical scanning unit rotates with a constant angular velocity, the density of points will automatically decrease within increasing distance from the optical axis. However, this density change is very small for a small field of view. It is therefore preferred if the control unit is configured to control the mechanical scanning unit such that the mirror performs rotational movements with a non-constant angular velocity. The angular velocity may change either stepwise or continuously.

If a mechanical scanning unit is used, the control unit may be configured to control the mechanical scanning unit such that the density of points depends on a velocity of the device and/or on a measured range to the object. This makes it possible, if desired, to obtain a perfectly homogenous density of illuminated points at all vehicle velocities and ranges.

The device may comprise an optical distribution matrix comprising a plurality of optical switches and configured to distribute the output light selectively to different optical waveguides, wherein there is a one-to-one correspondence between the optical waveguides and the free space couplers such that each free space coupler is connected to an associated optical waveguide. In other embodiments, a passive optical distribution matrix is used that comprises only passive optical splitters and amplifiers that can be individually controlled.

For FMCW LiDAR purposes it is preferred if the source is configured to produce light having a frequency that linearly rises and linearly falls alternately over time. However, other time dependencies of the frequency, e.g. a saw-tooth function, are also possible.

At least the free space couplers may be components of a photonic integrated circuit. However, in principle the free space couplers may not be connected to optical waveguides, but to optical fibers.

BRIEF DESCRIPTION OF THE DRAWINGS

Various features and advantages of the present invention may be more readily understood with reference to the following detailed description taken in conjunction with the accompanying drawings in which.

DETAILED DESCRIPTION OF EMBODIMENTS

1. Application Scenario

Figure 1:
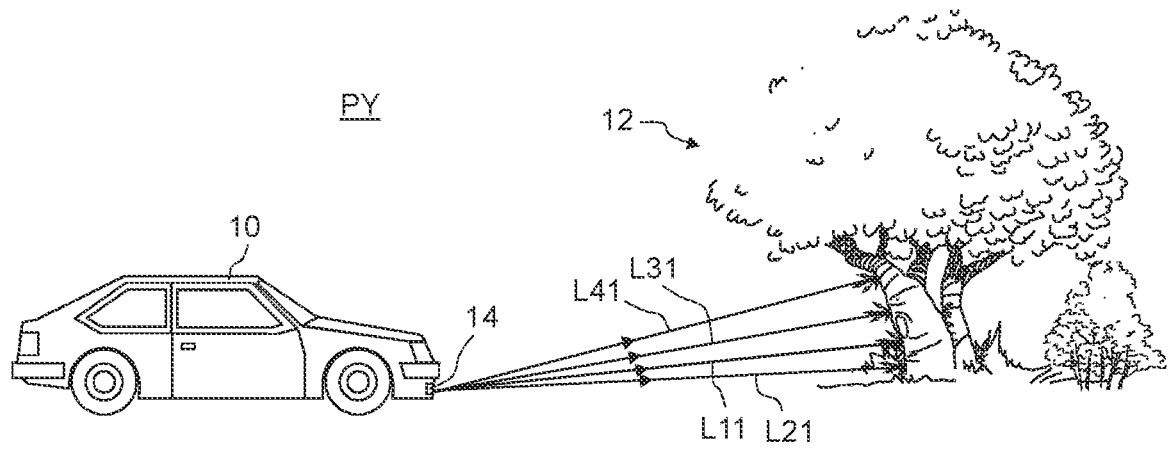
FIG. 1 is a schematic side view of a vehicle approaching an object which is detected by a scanning device according to the invention.

FIG. 1 is a schematic side view of a vehicle 10 approaching an object 12 that is represented by a tree. The vehicle 10 has at least one scanning device 14 that emits light beams L11, L21, L31 and L41 to scan the environment ahead of the vehicle 10. From the range information generated by the scanning device 14 a three-dimensional image of the environment can be calculated. In addition, the scanning device 14 determines the relative velocity to the object 12. This information is particularly important if the object 12 is another vehicle, an animal or a pedestrian that is also moving.

Figure 2:
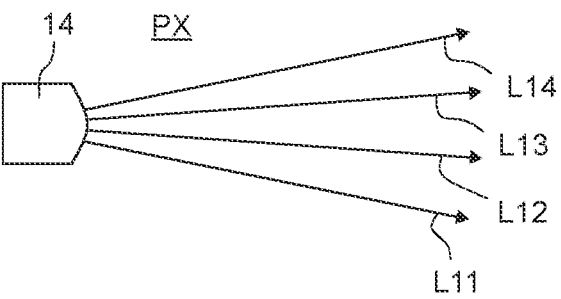
FIG. 2 is a top view of the scanning device shown in FIG. 1.

As can be seen in FIG. 1, the scanning device 14 emits the light beams L11 to L41 in different directions in a vertical scanning plane PY (in FIG. 1 this is the paper plane) in order to scan the environment in a vertical scanning direction. Scanning takes place also in a horizontal scanning direction, as this is shown in FIG. 2 which is a top view on the scanning device 14. Four light beams L11, L12, L13 and L14 are shown which are emitted in different directions in a horizontal scanning plane PX.

For reasons of clarity, it is assumed in FIGS. 1 and 2 that only four light beams Ln1 to Ln4 in n=4 different planes—i.e. a total of 16 light beams—are generated by the scanning device 14. However, in reality the scanning device 14 emits significantly more light beams. For example, $k \cdot 2^n$ light beams are preferred, where n is a natural number between 7 and 13 and indicates how many beams are emitted in one of k scanning planes inclined at different angles, where k is a natural number between 1 and 16. In some embodiments, more than one light beam is emitted at a given time in order to achieve the desired spatial and temporal resolution.

2. Scanning Device

Figure 3:
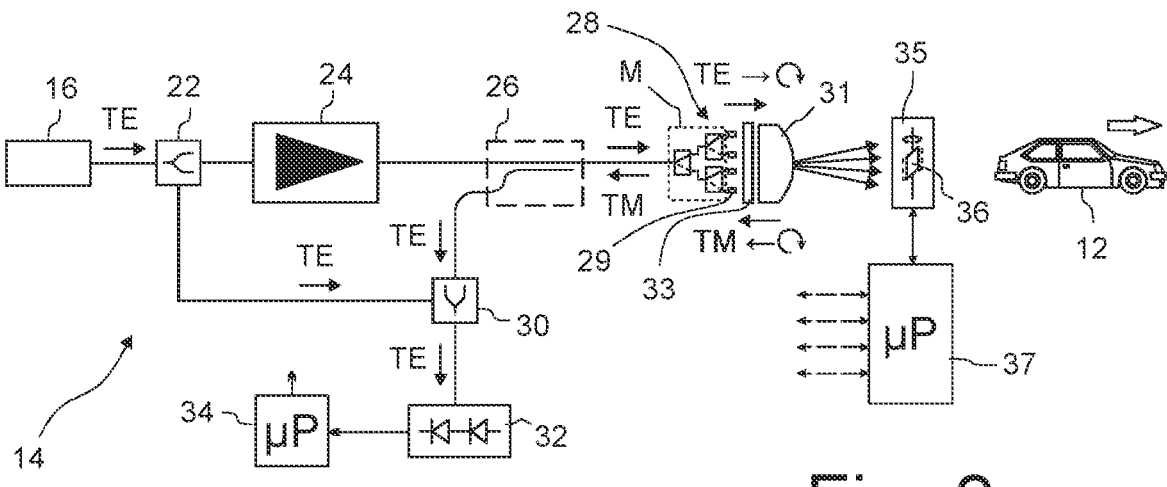
FIG. 3 schematically shows the architecture of the scanning device according to a first embodiment.

FIG. 3 schematically shows the basic design of the scanning device 14 according to an embodiment of the invention. The scanning device 14 is designed as a LiDAR system and comprises an FMCW light source 16 which generates measuring light in a TE0 state of polarization (SOP). The measuring light has a frequency f that varies ("chirps") periodically over time t between a lower frequency $f_l$ and a higher frequency $f_h$, as this is shown in FIG. 4.

Figure 4:
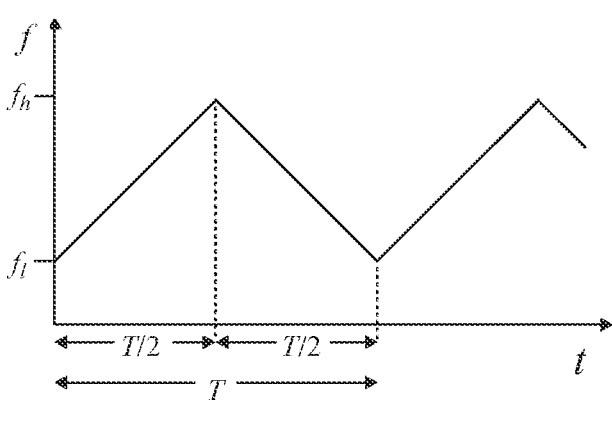
FIG. 4 is a graph illustrating the time dependent variation of the frequency of the light emitted by the scanning device.

FIG. 4 also illustrates that each measurement interval with a chirp duration T is divided into two halves of equal length T/2. During the first interval, the frequency increases linearly with a constant and positive upchirp rate $r_{chirp}$=df/dt. During the second interval, the frequency f decreases linearly with a constant negative downchirp rate $-r_{chirp}$. The frequency of the measured light can thus be described by a periodic triangular function. However, other functional relationships are also contemplated, e.g. sawtooth functions.

The light source 16 is connected to a splitter 22 that splits the measuring light into reference light (also referred to as local oscillator) and output light. In the illustrated embodiment, the output light is amplified by an optical amplifier 24 and is then guided to a polarization rotator-splitter 26 that directs the amplified output light, which is still in a TE0 SOP, to a deflection unit 28.

The deflection unit 28 directs the output light onto the object 12—represented in FIG. 3 by a moving car—along different directions, as it has been explained above with reference to FIGS. 1 and 2. To this end, the deflection unit 28 comprises, in the embodiment shown, a distribution matrix M that selectively directs the output light to one of a plurality of output waveguides each terminating in a free space coupler 29 that may be realized as a grating coupler, an edge coupler, a prism or a mirror. The free space couplers 29 are arranged along a straight line and thus form a linear array that is arranged in a front focal plane of collimating optics 31. The direction of output light emitted from the collimating optics 31 depends on the distance of the respective free space coupler 29 from the optical axis of the collimating optics 31, as this is known as such in the art. Here it is assumed that the linear array of the free space couplers 29 is arranged horizontally. Thus also the scanning takes place in a horizontal plane. For scanning in the vertical direction, a mechanical scanning unit 35 comprising a movable mirror schematically indicated at 36 is provided. The mechanical scanning unit 35 is controlled by a control unit 37 and vertically deflects the light beams that emerge from the collimating optics 31 in a horizontal plane. It should be noted that it is often advantageous to have an arrangement with exchanged roles, i.e. to arrange the free space couplers 29 along a vertical line in order to achieve vertical scanning, and to use the mechanical scanning unit 35 for the horizontal scan.

In still other embodiments, the scanning device 14 is a multi-channel device comprising a plurality of polarization rotator-splitters 26 each being associated with a single free space coupler 29 or with a group of free space couplers 29. In particular, each polarization rotator-splitter 26 may be directly connected to an associated free space coupler 29. With respect to possible locations of the polarization rotator-splitters 26 in an FMCW LiDAR PIC, reference is made to European patent application No. 21168784.3 filed on Apr. 16, 2021. The full disclosure of this earlier application is incorporated herein by reference.

Referring again to FIG. 3, a quarter-wave plate 33 is arranged between the free space couplers 29 and the collimating optics 31. The quarter-wave plate 33 transforms the TE0 SOP of the emitted output light into a circular SOP, as this is indicated in FIG. 3 by symbols.

The output light emitted by the deflection unit 28 is at least partially diffusely reflected at the object 12. A small portion of the reflected light thus returns to the deflection unit 28, where it passes the quarter-wave plate 33 again and is re-coupled into the free space couplers 29. The quarter-wave plate 33 transforms the circular SOP of the reflected light into a TM0 SOP, as this is indicated in FIG. 3 by symbols.

The polarization rotator-splitter 26 separates the reflected light TM0 mode from the output light TE0 mode traveling in the waveguide along the opposite direction. Furthermore, it simultaneously transforms the TM0 mode of the reflected light into a TE0 mode. More details relating to this transformation and the polarization rotator-splitter 26 in general may be gleaned from U.S. patent application Ser. No. 17/511,361 filed Oct. 26, 2021. The reflected and split-off light, now again in a TE0 SOP, is directed to a combiner 30 where it is superimposed with the reference light that has been separated from the measurement light by the splitter 22. Since the frequencies of the superimposed light components are slightly different due to the different optical path lengths, a beat signal is generated which is detected by a symmetrical photodetector or another type of detector 32. The electrical signals generated by the detector 32 are fed to a calculation unit 34, which calculates the range R and the relative radial velocity v to the object 12 on the basis of the detected beat frequencies.

With the exception of the quarter-wave plate 33 and the collimating optics 31, all components shown in FIG. 3 and described in the foregoing are integrated in a photonic integrated circuit (PIC).

Figure 5:
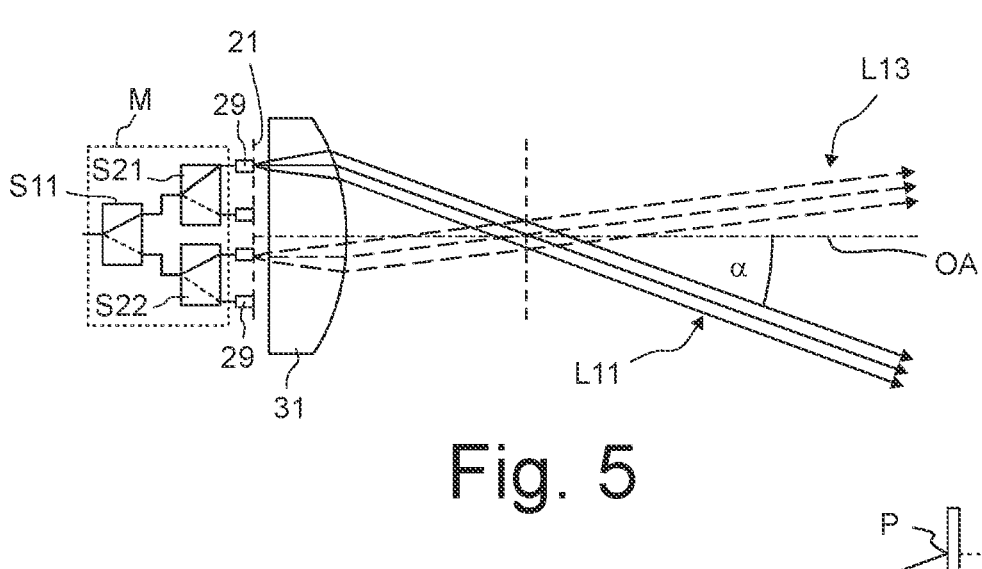
FIG. 5 schematically shows how the light beams are steered by a distribution matrix and a collimating optics of the scanning device shown in FIG. 3.

FIG. 5 is an enlarged cutout from FIG. 3; the quarter-wave plate 33 is omitted for the sake of simplicity. This figure illustrates in more detail how the beam steering for horizontal scanning is achieved in the scanning device 14. The free space couplers 29 are arrayed in the front focal plane 21 of the collimating optics 31, which deflects the light out-coupled from the free space couplers 29 such that it is emitted in different directions. As a result of the arrangement in the front focal plane 21, there is an unambiguous relationship between the locations of the each free space couplers 29 and emission directions. If the output light is switched sequentially onto the free space couplers 29 using optical switches S11, S21, S22 contained in the distribution matrix M, the output light collimated by the collimating optics 31 will be directed into various directions α with respect to the optical axis OA of the collimating optics 31, as this is indicated in FIG. 5 for two free space couplers 29 with solid lines (light beam L11) and dashed lines (light beam L13).

In other embodiments, an external optical circulator is used instead of the polarization rotator-splitter 26, and the quarter-wave plate 33 is dispensed with.

3. Scanning Due to Movement

Figure 6:
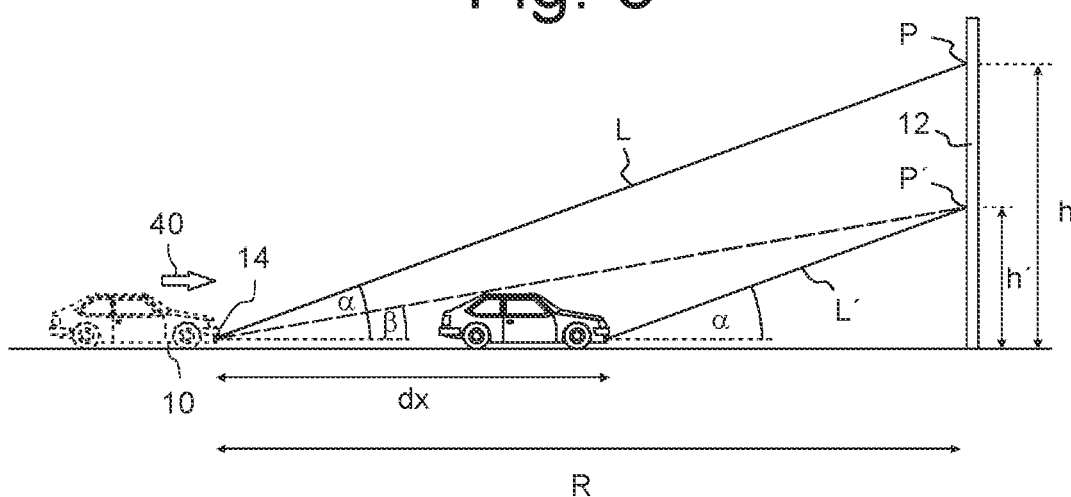
FIG. 6 is a side view of a vehicle supporting a scanning device that scans the environment while the vehicle approaches a wall.

FIG. 6 shows a car 10 on which the scanning device 14 is mounted. It is assumed that the car 10 moves with a constant velocity v along a direction of movement that is indicated by an arrow 40 and coincides with the optical axis OA of the scanning device 14. During a time dt the scanning device 14 advances by a distance dx towards an object 12 which is represented in FIG. 6 by a wall oriented perpendicularly to the optical axis OA.

The scanning device 14 subsequently emits one or more light rays, as this has been explained above with reference to FIGS. 1 and 2. In FIG. 6 only one light beam L is shown that is emitted with an emission angle α relative to the optical axis OA.

At time t, this light ray L illuminates a point P on the object 12 at a height h. At a later time t'=t+dt, a light beam L' emitted with the same emission angle α illuminates a different point P' on the object at a smaller height h'. The height difference dh=h−h' can be interpreted as an additional scan effect caused by the movement of the scanning device 14. Put differently, the second point P' would have been illuminated with a stationary scanning device 14 at time t if there had been an additional emission or scanning angle β, see FIG. 6.

It can be shown that this additional scanning angle β depends on the velocity v, the emission angle α, the range R to the object and the time $T_{int}$ passing until the scanning device 14 emits a light beam along the same direction again. More specifically, β is given by the following equation:

$$\beta = \frac{v \cdot T_{int} \cdot \sin(2\alpha)}{2 \cdot R} \tag{1}$$

Figure 7:
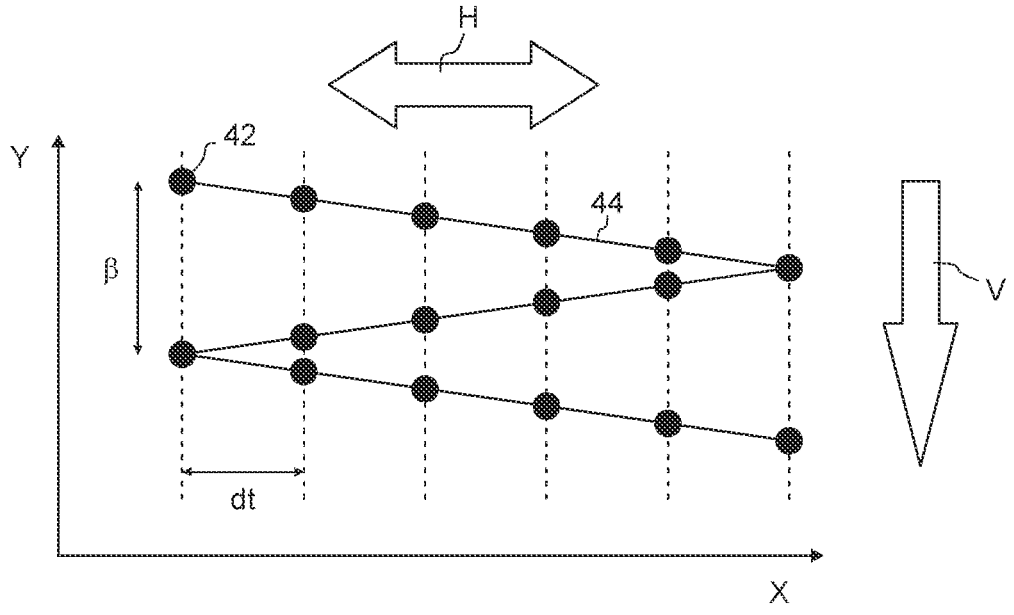
FIG. 7 illustrates a typical pixel pattern that is produced by a single light beam during a horizontal scan process while the scanning device moves.

FIG. 7 illustrates a typical pixel pattern that is produced by a single light beam during a horizontal scan process while the scanning device 14 moves. Here it is assumed that (a) the light beam performs periodic scan movements along a horizontal scan direction H from the left to the right, then back to the left, and so on, as indicated by line 44, and (b) that the linear arrangement of free space couplers 29 is equidistant so that also the horizontal spacing of the spots 42 is equidistant.

It can be seen in FIG. 7 that due to the movement of the scanning device 14, a scan effect along a vertical scan direction V is superimposed. Although the light beam is always emitted with the same emission angle α in the plane of the paper in FIG. 6, the spots 42 illuminated on the object 12 move downward as the vehicle approaches the object 12.

For a single light beam, the frame rate FR describes how many points are illuminated per second. Thus the time required for the light beam to illuminate an adjacent spot 42 is dt=1/FR. If the light beam returns to its original horizontal position after N spots 42 have been illuminated, then $$T_{int} = N \cdot dt = N \cdot \frac{1}{FR} = \frac{N}{FR} \tag{2}$$

The maximum additional scan angle β occurs for the largest emission angle $\alpha_{FOV}$ that defines the field of view (FOV). Using equation (2), β then becomes $$\beta = \frac{v \cdot N \cdot \sin(2\alpha_{FOV})}{2 \cdot FR \cdot R} \tag{3}$$

The additional scan effect becomes significant only in certain constellations, for example if the field of view (FOV) is large and the velocity v is high. For example, an additional scanning angle β of about 0.6° is achieved with N=1, a frame rate FR=25, a range R=50 m, a velocity v=30 m/s and $\alpha_{FOV}$=25°. Even higher additional scanning angles β of about 1.8° occur with N=10, a frame rate FR=25, a range R=150 m, a velocity v=20 m/s and $\alpha_{FOV}$=25°. Still higher additional scan angles β would be possible with larger velocities and smaller ranges R, but such scenarios are not realistic.

In the foregoing, an additional vertical scan effect has been explained with reference to FIG. 6. As a matter of course, there is also an additional horizontal scan effect while the vehicle 10 moves. This additional horizontal scan effect may be even more significant because the field of view, and thus $\alpha_{FOV}$, is typically larger in the horizontal direction as in the vertical direction.

In principle, the additional scan effect also occurs if the scanning device 14 is stationary and the object 12 is moving. However, for small objects such as cars or pedestrians this effect cannot be reasonably exploited, and large objects such as ships usually do not move fast enough.

The additional scan effect occurring in important constellations can be used to obtain an increased spatial resolution towards the edges of the field of view.

Another approach is to depart from the equidistant arrangement of the free space couplers by rearranging them in such a manner that the spatial resolution is increased without increasing the number of free space couplers 29. This approach will be explained in more detail in the next section.

4. Non-Equidistant Free Space Couplers

Figure 8:
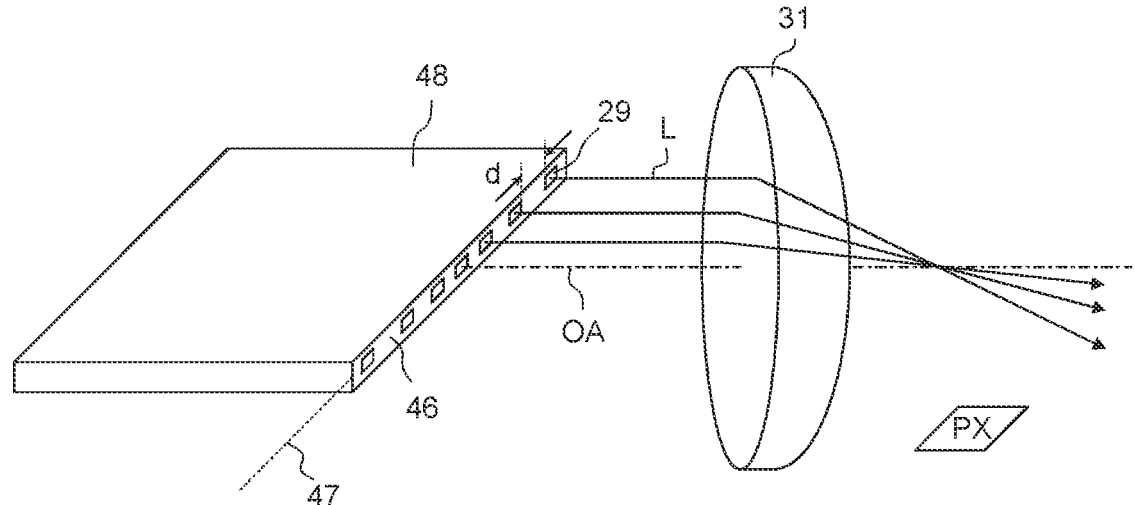
FIG. 8 is a schematic illustration showing a plurality of free space couplers arranged at a front end surface of a photonic integrated circuit.

FIG. 8 is a schematic illustration showing a plurality of free space couplers 29 arranged at a front end surface 46 of a photonic integrated circuit 48. The latter may also include the splitter 22, the polarization rotator-splitter 26, the combiner 30, the distribution matrix M and the detector 32. As in the preceding embodiments, all free space couplers 29 are arranged along a straight line 47 that lies in the front focal plane of the collimating optics 31. The emission directions of the free space couplers 29 (it should be noted that for certain types of free space couplers 29, this direction is not orthogonal to the front end surface 46) defines the scanning plane PX.

It can be seen in FIG. 8 that the distance d between adjacent free space couplers 29 increases—or the linear density of the free space couplers 29 decreases, which is the same—with increasing distance from the optical axis OA.

Figure 9:
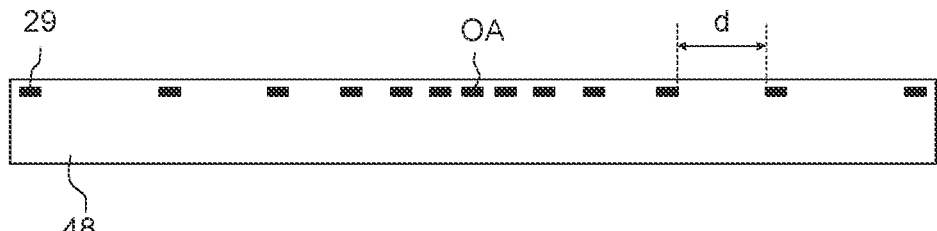
FIG. 9 is a view on the front end surface of the photonic integrated circuit according to a slightly different embodiment.

This can also be seen in FIG. 9 which is a view on the front end surface 46 of the photonic integrated circuit 48 according to a slightly different embodiment with more free space couplers 29. In this embodiment, the distance d between adjacent free space couplers 29 increases approximately according to a tangent function. On the optical axis OA the linear density is highest and then continuously decreases with increasing distance from the optical axis OA. In the stationary case (v=0), the pixel pattern subsequently illuminated on the object 12 directly corresponds to the arrangement of free space couplers 29 shown in FIG. 9.

Under certain, but practically important conditions such as high velocities v and medium ranges R, the additional scan angles β virtually "fill" the gaps between the points 42 illuminated by the free space couplers 29 on the object 12. Thus a higher fraction of the available free space couplers 29 can be used for smaller emission angles, thereby increasing the spatial resolution for important constellations without increasing the same number of free space couplers 29.

Figure 10:
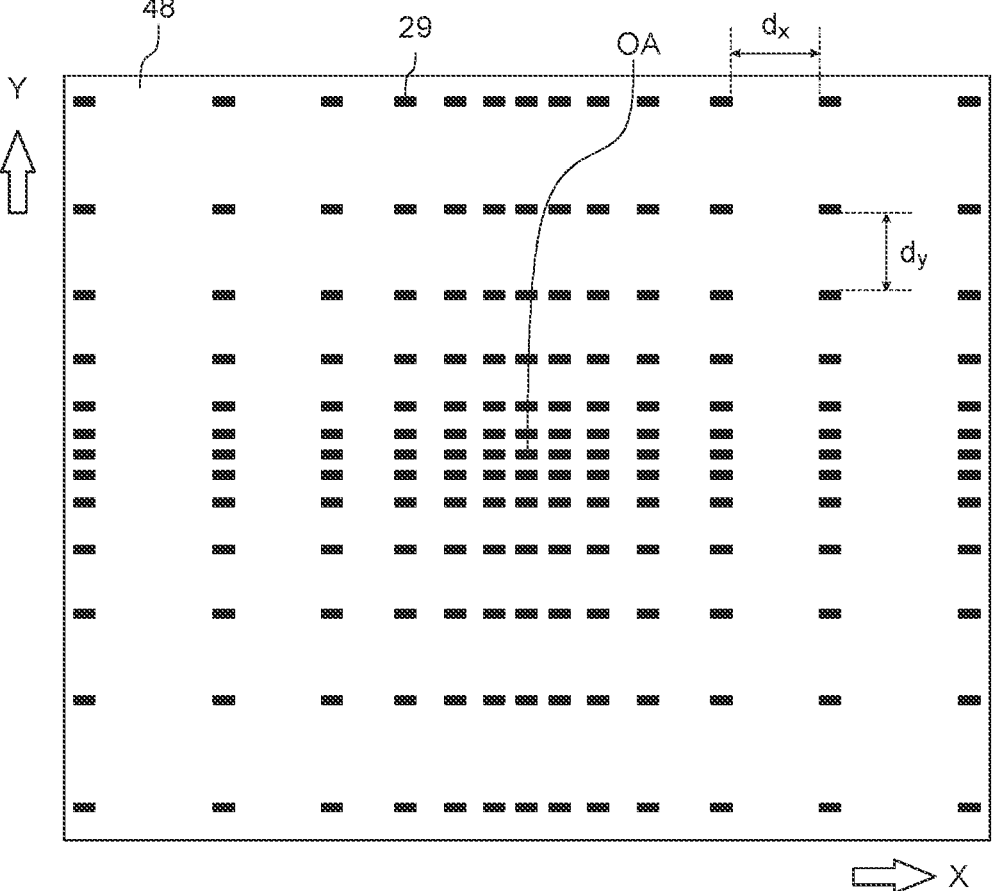
FIG. 10 is a view similar to FIG. 9, but for the case that the free space couplers are arranged in a two-dimensional array.

FIG. 10 is an illustration similar to FIG. 9, but for the case that the free space couplers 29 are not only arranged along a (straight) line, but in a two-dimensional array extending in X and Y directions. With such an arrangement, scanning is achieved both along the horizontal (X) and the vertical (Y) direction so that the mechanical scanning unit 35 can be dispensed with. Since the additional scan effect due to movement is isotropic, the distances $d_x$, $d_y$ between adjacent free space couplers 29 along the X and Y direction, respectively, may follow the same (e.g. cubic) function for both directions X and Y.

5. Control of Mechanical Scanning Unit

Manufacturing a photonic integrated circuit 48 comprising a two-dimensional array of free space couplers 29, as this is illustrated in FIG. 10, is currently only feasible for laboratory purposes, but not for large scale commercial production at reasonable costs.

If the mechanical scanning unit 35 shown in FIG. 3 is used for scanning in the perpendicular scanning plane (usually vertically oriented), the control unit 37 may be configured to control the mechanical scanning unit 35 such that a density of points, which are illuminated by the output light on the object 12 (or generally in a plane perpendicular to the optical axis OA), decreases along the other scanning direction with increasing distance from the optical axis OA. The pattern of illuminated points 42 may then look similar as the pattern of free space couplers 29 shown in FIG. 10. This can be achieved by controlling the mechanical scanning unit such 35 that the mirror 36 performs rotational movements with a non-constant angular velocity. The angular velocity may change either stepwise or continuously. For a moving scanning device 14, it is then possible to obtain a higher spatial resolution with the same number of illuminated points 42.

While the arrangement of free space couplers 29 is necessarily fixed, the directions along which the mechanical scanning unit 35 deflects the output light can be easily changed by appropriately controlling the mirror 36. This makes it possible to control the mechanical scanning unit such 35 such that the density of illuminated points depends on the velocity v of the vehicle and/or on a measured range R to the object 12. Being able to adapt the density of points allows to obtain a perfectly homogenous and very high density of illuminated points at a wide range of vehicle velocities and ranges.

6. Alternative Layout of Photonic Integrated Circuit

Figure 11:
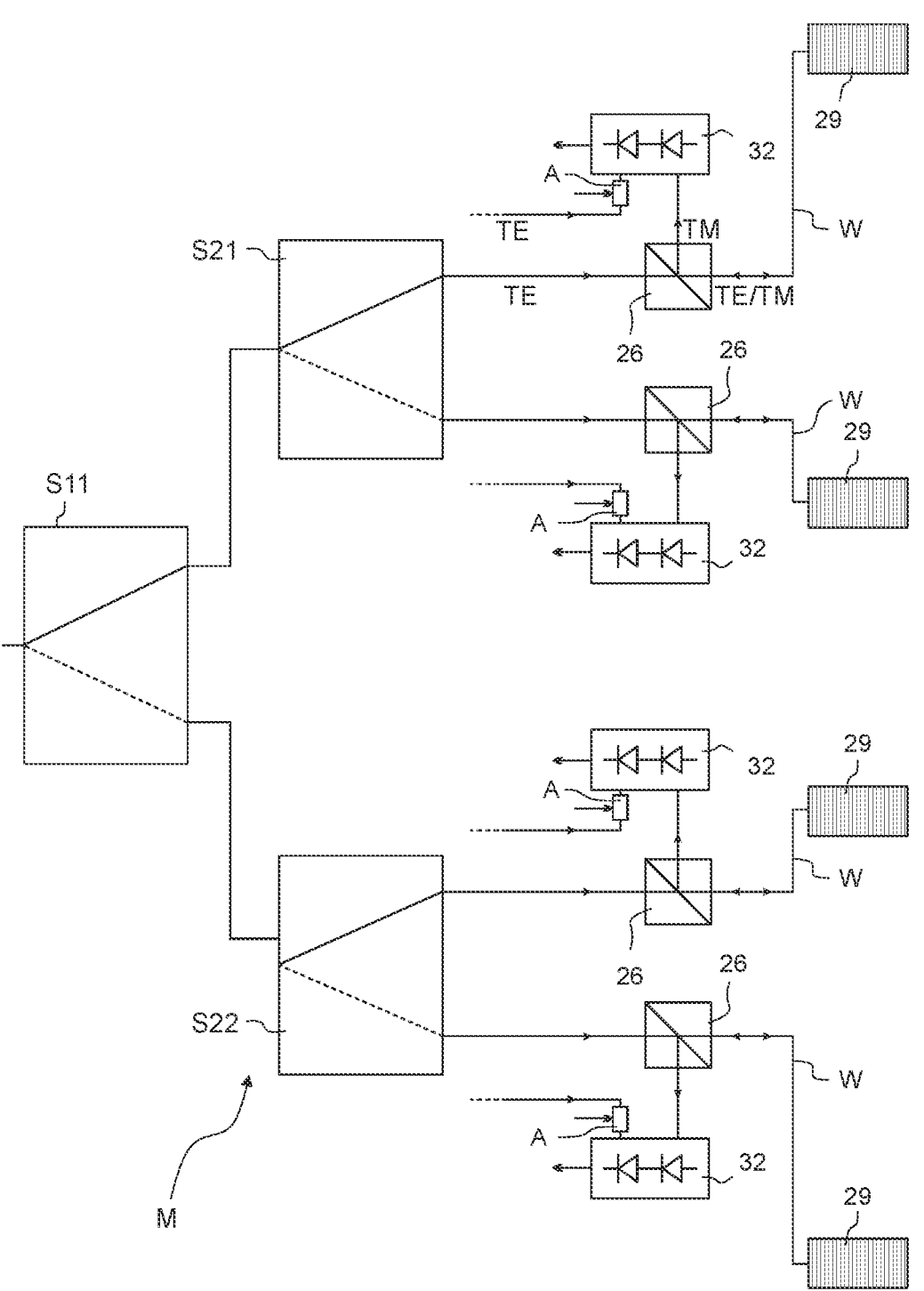
FIG. 11 schematically shows a portion of a photonic integrated circuit in which a detector and a polarization sensitive light splitter is associated with each free space coupler.

In the embodiment shown in FIG. 3 it has been assumed that there is a common detector 32 for all optical channels. FIG. 11 schematically illustrates an embodiment in which there are four optical channels each having its own detector 32. This has the advantage that the weak reflected input light reflected from the object 12 does not have to pass the distribution matrix M before it reaches the detector 31 and superimposes with the reference light. As mentioned further above, this would involve significant optical losses occurring in the optical switches S11, S21 and S22.

Variable attenuators A are provided in each optical channel that attenuate the reference light guided towards the detectors 32 such that it can perfectly interfere with the reflected input light. The optical waveguides connecting the polarization splitter-rotators 26 with the respective free space coupler 29 are designated with W.

In a real scanning device 14, the distribution matrix M may have more than only two switch levels. For example, with five switch levels the output light may be distributed among $2^5=32$ free space couplers 29. By combining several, for example eight, such units in a parallel architecture in a single photonic integrated circuit 48, 8×32=256 directions in one scanning plane are available, wherein eight light beams can be emitted simultaneously. By exploiting the additional scan effect due to the movement of the scanning device 14 relative to the object 12, a higher spatial resolution (more than 256 in this example) can be achieved under certain conditions.

The invention claimed is:

1. A device for scanning frequency-modulated continuous wave (FMCW) LiDAR range measurement, comprising
    a light source configured to produce light having a varying frequency,
    a splitter configured to split the light into reference light and output light,
    a plurality of free space couplers arranged along a line, wherein each free space coupler is configured to
        outcouple the output light into the free space and
        to receive input light, which was reflected at an object,
    an optical system having an optical axis and configured to deflect the output light outcoupled by the free space couplers so that the output light is emitted in different directions lying in a first scanning plane,
    a detector configured to detect a superposition of the input light with the reference light, and
    a calculation unit configured to determine the range to the object from the superposition detected by the detector, wherein
    at least for a plurality of adjacent free space couplers, a distance between adjacent free space couplers continuously increases with increasing distance from the optical axis.

2. The device of claim 1, wherein the distance between adjacent free space couplers continuously increases with increasing distance from the optical axis at least substantially according to a non-linear function.

3. The device of claim 1, wherein the free space couplers are arranged in a front focal plane of the optical system.

4. The device of claim 1, wherein the free space couplers are arranged in a two-dimensional array so that the output light is also emitted in different directions lying in a second scanning plane that is different from the first scanning plane, and wherein a density of the free space couplers continuously decreases along a second scanning direction, which is defined by the second scanning plane, with increasing distance from the optical axis of the optical system.

5. The device of claim 1, wherein
the optical system is arranged in a light path between the free space couplers and a mechanical scanning unit,
the mechanical scanning unit comprises a movable mirror and is configured to deflect the output light along directions lying in a second scanning plane that is different from the first scanning plane, and wherein
the device comprises a control unit that is configured to control the mechanical scanning unit such that a density of points, which are illuminated by the output light in a plane perpendicular to the optical axis, decreases along a second scanning direction, which is defined by the second scanning plane, with increasing distance from the optical axis.

6. The device of claim 5, wherein the control unit is configured to control the mechanical scanning unit such that the mirror performs rotational movements with a non-constant angular velocity.

7. The device of claim 5, wherein the control unit is configured to control the mechanical scanning unit such that the density of points depends on a velocity of the device.

8. The device of claim 5, wherein the control unit is configured to control the mechanical scanning unit such that the density of points depends on a measured range to the object.

9. The device of claim 1, comprising an optical distribution matrix comprising a plurality of optical switches and configured to distribute the output light selectively to different optical waveguide, and wherein there is a one-to-one correspondence between the optical waveguides and the free space couplers such that each free space coupler is connected to an associated optical waveguide.

10. The device of claim 1, wherein at least the free space couplers are components of a photonic integrated circuit.

11. A device for scanning frequency-modulated continuous wave (FMCW) LiDAR range measurement, comprising
a light source configured to produce light having a varying frequency,
a splitter configured to split the light into reference light and output light,
at least one free space coupler configured to outcouple the output light into the free space and to receive input light, which was reflected at an object,
a mechanical scanning unit comprising a movable mirror and configured to deflect the output light into different directions that lie in a scanning plane, wherein said different directions include a central direction, a detector configured to detect a superposition of the input light with the reference light,
a calculation unit configured to determine the range to the object from the superposition detected by the detector,
a control unit configured to control the mechanical scanning unit such that a density of points, which are illuminated by the output light in a plane that is perpendicular to the central direction, continuously decreases with increasing distance from the central direction.

12. The device of claim 11, wherein the control unit is configured to control the mechanical scanning unit such that the mirror performs rotational movements with a non-constant angular velocity.

13. The device of claim 11, wherein the control unit is configured to control the mechanical scanning unit such that the density of points depends on a velocity of the device.

14. The device of claim 11, wherein the control unit is configured to control the mechanical scanning unit such that the density of points depends on a measured range to the object.

15. A device for scanning frequency-modulated continuous wave (FMCW) LiDAR range measurement, comprising
a light source configured to produce light having a varying frequency,
a splitter configured to split the light into reference light and output light,
a plurality of free space couplers arranged in a two-dimensional array, wherein each free space coupler is configured to outcouple the output light into the free space and to receive input light, which was reflected at an object,
an optical system having an optical axis and configured to deflect the output light outcoupled by the free space couplers so that the output light is emitted in different directions,
a detector configured to detect a superposition of the input light with the reference light, and
a calculation unit configured to determine the range to the object from the superposition detected by the detector, wherein
a density of the free space couplers continuously decreases with increasing distance from the optical axis of the optical system.

16. The device of claim 15, wherein the density of the free space couplers continuously decreases with increasing distance from the optical axis at least substantially according to a non-linear function.

17. The device of claim 15, wherein the free space couplers are arranged in a front focal plane of the optical system.

18. The device of claim 15, comprising an optical distribution matrix comprising a plurality of optical switches and configured to distribute the output light selectively to different optical waveguide, and wherein there is a one-to-one correspondence between the optical waveguides and the free space couplers such that each free space coupler is connected to an associated optical waveguide.

19. The device of claim 15, wherein at least the free space couplers are components of a photonic integrated circuit.

\* \* \* \* \*